United States Patent [19]

Aono et al.

[11] Patent Number: 4,471,162

[45] Date of Patent: Sep. 11, 1984

[54] COORDINATE READING APPARATUS

[75] Inventors: Yoshihito Aono, Atsugi; Yukio Takeda, Zama; Naoto Tanabe, Kawasaki, all of Japan

[73] Assignee: Fujitsu Limited, Kawasaki, Japan

[21] Appl. No.: 454,079

[22] Filed: Dec. 28, 1982

[30] Foreign Application Priority Data

Dec. 28, 1981 [JP] Japan ............................ 56-209780

[51] Int. Cl.$^3$ .......................................... G08C 21/00
[52] U.S. Cl. .................................... 178/19; 33/1 M; 178/18
[58] Field of Search ................... 178/18, 19; 364/520; 33/1 M

[56] References Cited

U.S. PATENT DOCUMENTS 3,873,770  3/1975  Ioannou ............................ 178/18
4,255,617  3/1981  Carau, Sr. et al. ................. 178/19

OTHER PUBLICATIONS

Y. Takeda et al., "A New Data Tablet Superposed by a Plasma Display Panel," National Telecommunications Conference 1981, Nov. 29–Dec. 3, 1981, pp. G.5.4.1, Marriott Hotel, New Orleans, Louisiana.

Primary Examiner—Stafford D. Schreyer
Attorney, Agent, or Firm—Staas & Halsey

[57] ABSTRACT

A coordinate reading apparatus for reading positions on a tablet, having magnetic-field generating coils, with a magnetic-field detector. The magnetic-field detector produces an analog electric signal corresponding to a desired position to be read on the tablet in response to the magnetic fields induced by the magnetic-field generating coils. The analog electric signal generated by the detector is composed of both a fundamental wave component signal and an n-th order harmonic wave component signal (n being an integer equal to or larger than 2). A processing unit for receiving the analog electric signal from the magnetic-field detector and produces coordinate data corresponding to the desired position to beread on the tablet by analyzing a first rotating magnetic-field vector induced by the fundamental wave component signal and a second rotating magnetic-field vector induced by the n-th order harmonic wave component signal. The phase component of the fundamental wave component signal and the phase component of the n-th harmonic wave component signal are processed so that the coordinate data can be read by the processing unit.

8 Claims, 24 Drawing Figures

COORDINATE READING APPARATUS

BACKGROUND OF THE INVENTION

1. Field of the Invention

The present invention relates to a coordinate reading apparatus, i.e., a so-called digitizer, more particularly, a coordinate reading apparatus in which coordinates corresponding to a specified position on a tablet are read by detecting the phases of rotating magnetic fields induced above the tablet by means of a plurality of magnetic-field generating coils.

2. Description of the Prior Art

A coordinate reading apparatus is a device in which coordinates of a pen, i.e., a position detector located on a table, are read. Such a coordinate reading apparatus is useful as a graphic information processing system which is very important in many technical fields, for example, automatic design or automatic drawing.

In the coordinate reading apparatus of the prior art, three methods have been proposed and put into practical use. The first is a method based on an electrostatic coupling between the tablet and the position detector, the second is a method based on the electromagnetic induction between the tablet and the position detector, and the third is a method based on the ohmic resistance obtained from the tablet.

A coordinate reading apparatus constructed according to the second method, i.e., the electromagnetic induction method, and achieving the detection of position by utilizing the phases of rotating magnetic fields has been proposed in U.S. Ser. No. 238,961, filed Feb. 27, 1981, now U.S. Pat. No. 4,418,242. The coordinate reading apparatus of U.S. Pat. No. No. 4,418,242 is comprised of: a plurality of magnetic-field generating coils arranged in a tablet in parallel with each other; an alternating signal generator which supplies to the coils a plurality of driving signals, the phases of which are shifted one by one with respect to each other, so as to induce the rotating magnetic fields above the tablet, the phases of which differ from each other in accordance with the positions on the tablet; and a magnetic-field detector, contained in a pen, which is located above the tablet and detects the rotating magnetic fields. The rotating magnetic fields are formed so that the phases continuously change from 0° to 360° along positions from one side of the tablet to the other.

Thus, it is possible to determine the coordinates at which a pen is positioned on the tablet by determining the phase detected by the magnetic-field detector.

The coordinate reading apparatus of U.S. Pat. No. 4,418,242 will be explained in further detail hereinafter, however, that apparatus is not considered to be accurate enough. To be more specific, while the phases of the rotating magnetic fields should change linearly from one side of the tablet to the other, they actually change in an approximately S shaped pattern. The desired linearity has only been obtained at the center of the tablet.

Under such circumstances, it has been desired to realize a coordinate reading apparatus which can produce the desired linearity over the entire surface of the tablet.

SUMMARY OF THE INVENTION

It is an object of the present invention to provide a coordinate reading apparatus which can detect coordinates at any position on a tablet with a high degree of accuracy.

The above object is attained by the following technique. First, both a fundamental wave component and a harmonic wave component of n-th order (n being an integer equal to or larger than 2) of the driving signal are extracted via a magnetic-field detector. Second, n number of areas of the tablet are defined based on the n-th order harmonic wave component to allow a desired position to be detected with a high degree of accuracy in any corresponding one of the n number of the areas. Third, the position of the area including the desired position to be detected is determined from the n number of areas. This allows the coordinates at the specified position to be read.

BRIEF DESCRIPTION OF THE DRAWINGS

The present invention will be more apparent from the ensuing description with reference to the accompanying drawings, wherein.

DESCRIPTION OF THE PREFERRED EMBODIMENTS

Prior to disclosing the coordinate reading apparatus of the present invention, a typical coordinate reading apparatus and also the above-mentioned coordinate reading apparatus of U.S. Pat. No. 4,418,242 will be explained below with reference to FIGS. 1 through 10.

Figure 1:
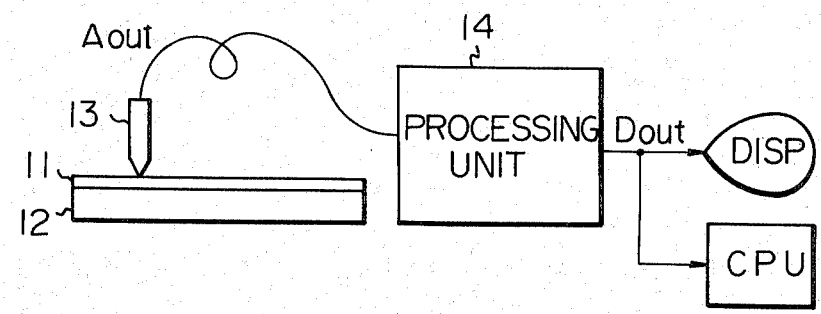
FIG. 1 is a block diagram of a typical coordinate reading apparatus.

FIG. 1 is a block diagram of a typical coordinate reading apparatus. In FIG. 1, reference numeral 11 is a tablet on which surface coordinates are defined. In order to find the coordinates of a desired position a ball-pen type position detector 13 is touched, at its edge, at the desired position by an operator. In this case, the tablet 11 is integrally provided with an electric coupling means 12 so that an electric coupling, between the position detector 13 and the position of the coordinates can be created. When the position detector 13 is located on the tablet 11, the detector 13 produces an analog electric signal $A_{out}$ corresponding to the coordinates. In order to find what coordinate data is indicated by the analog electric signal $A_{out}$, the signal $A_{out}$ is applied to a processing unit 14 and the coordinate data output $D_{out}$ is obtained therefrom. The coordinate data output $D_{out}$ may be displayed on a display (DISP) or applied to a central processing unit (CPU) and processed therein. It should be understood that, in the present invention, only a system for obtaining the coordinate data output $D_{out}$ is mentioned. Accordingly, systems for dealing with the data output $D_{out}$, such as the above-mentioned display and the central processing units, are not mentioned.

Figure 2:
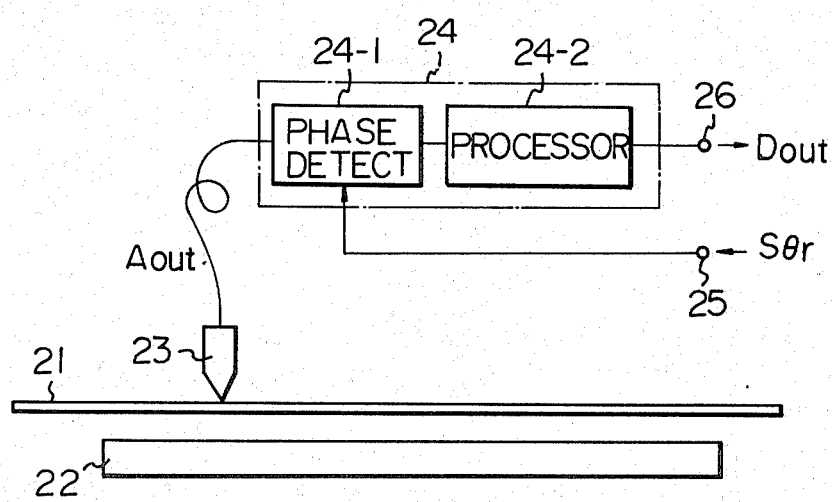
FIG. 2 is a schematic view of the coordinate reading apparatus proposed in U.S. Pat. No. 4,418,242.

FIG. 2 is a schematic view of the coordinate reading apparatus proposed in U.S. Pat. No. 4,418,242. In FIG. 2, reference numeral 21 represents a tablet (corresponding to 11 in FIG. 1), 22 represents magnetic-field generating equipment (corresponding to 12 in FIG. 1), 23 represents a position detector (corresponding to 13 in FIG. 1), and 24 represents a processing unit (corresponding to 14 in FIG. 1). It should be understood that, in actual arrangement, the members 21 and 22 are formed as one body. Reference numeral 24-1 represents a phase detector and 24-2 represents a processor. The processor 24-2 stores therein, in advance, a table indicating a relationship between the x coordinate on the tablet 21 and the phase $\theta$, that is $x=f(\theta)$, and produces x coordinate data output $D_{out}$ from an output terminal 26 via the phase detector 24-1 which detects the phase $\theta$ of the analog electric signal $A_{out}$ supplied from the position detector 23. When the phase detector 24-1 determines the value of the phase $\theta$, it is necessary to compare the output phase $\theta$ of the signal $A_{out}$ with a reference phase $\theta_r$ and, accordingly, a signal $S\theta_r$, having a predetermined reference phase, is supplied from an input terminal 25.

Figure 3:
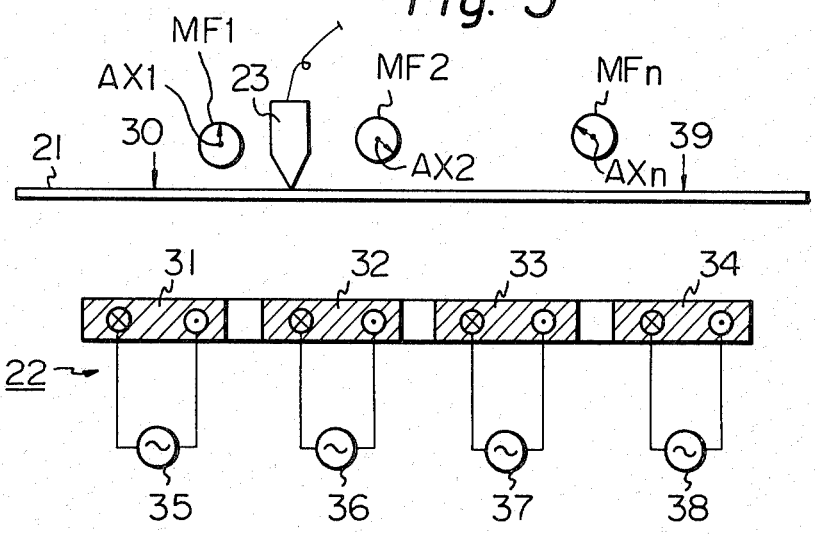
FIG. 3 is an arrangement of the magnetic-field generating equipment shown in FIG. 2.

The analog electric signal $A_{out}$ from the position detector 23 is created by a coupling between the detector 23 and the magnetic field induced by the magnetic-field generating equipment 22, where the phase $\theta$ of the signal $A_{out}$ varies in accordance with a variation of the x coordinate. In order to produce such magnetic fields, the magnetic-field generating equipment can be constructed as shown in FIG. 3. FIG. 3 is a schematic diagram of an arrangement of the magnetic-field generating equipment 22 shown in FIG. 2. In FIG. 3, the magnetic-field generating equipment 22 is comprised of magnetic-field generating coils, for example four coils 31, 32, 33, and 34, and alternating signal sources 35, 36, 37, and 38 which apply respective alternating signals to the coils. The phases of the alternating signals are shifted with respect to each other. The magnetic fields induced by the magnetic-field generating coils 31 through 34 are detected by the position detector 23 which is above the tablet 21.

The alternating signals, produced from the above-mentioned alternating signal sources 35 through 38, may be defined by, for example the following signals, respectively.

$$E_1 \sin(\omega t + 0)$$

$$E_2 \sin\left(\omega t + \frac{\pi}{3}\right)$$

$$E_3 \sin\left(\omega t + \frac{2}{3}\pi\right)$$

$$E_4 \sin(\omega t + \pi)$$

where, $E_1$ through $E_4$ denote voltage amplitudes of the alternating signals, $\omega$ denotes an angular velocity, t denotes a time, and 0, $(\pi/3)$, $(\frac{2}{3}\pi)$, and $\pi$ are phases in radians. The angular velocity $\omega$ is represented by $\omega=2\pi f$ and the alternating signal sources 35 through 38 are driven synchronously at the same frequency f.

Figure 4:
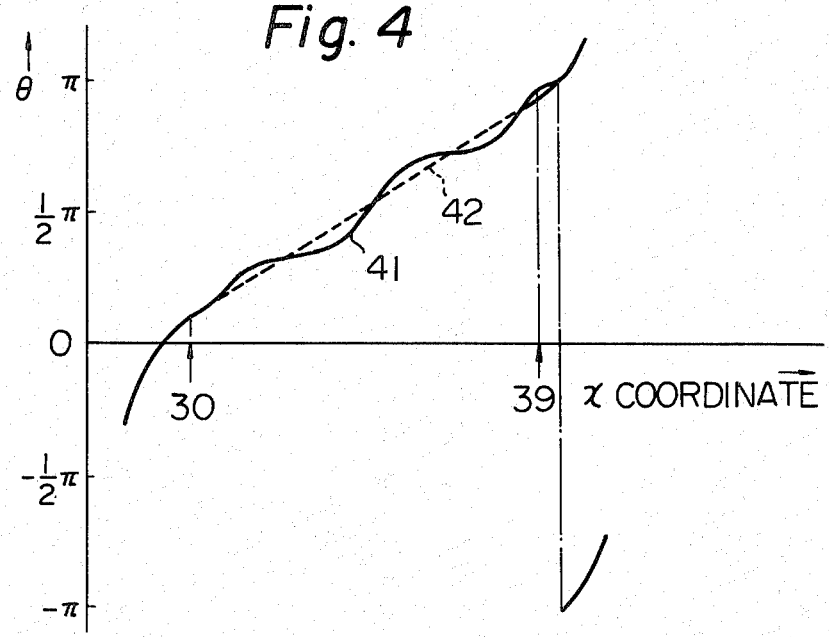
FIG. 4 is a graph of the variation of the phase of the analog electric signal produced from a position detector with respect to the variation of the x coordinate on a tablet.

FIG. 4 is a graph illustrating the variation of the phase $\theta$ of the analog electric signal $A_{out}$ produced by the position detector 23, with respect to the variation of the x coordinate on the tablet 21. In the graph, a curve 41 (solid line) indicates experimental results which are obtained by using the magnetic-field generating coils 31 through 34 and the alternating signal sources 35 through 38 during a locational and continuous shift of the edge of the position detector 23 along a path between x coordinates 30 and 39 on the tablet 21. As seen from the graph, the curve 41 varies along a straight line 42 (dotted line) and thus an almost linear relationship between the phase $\theta$ and the x coordinate can be realized. It should be recognized that the straight line 42 corresponds to the relationship, $x=f(\theta)$, between the x coordinate and the phase $\theta$.

As will be known from the graph, the coordinate data between the x coordinates 30 and 39 can be obtained continuously by employing only four magnetic-field generating coils. The reason for this is derived from the fact that the rotating magnetic fields, each having a cylindrical shape, are continuously formed above the tablet. The cylindrical rotating magnetic fields will be explained in detail hereinafter, but in short, some of these magnetic fields may be schematically illustrated as circles MF1, MF2, ... MFn in FIG. 3. Axes AX1, AX2, ..., AXn of respective cylindrical fields extend in a direction perpendicular to the surface of the drawing. Vectors of the cylindrical fields are represented by arrows shown in respective cylindrical fields MF1, MF2, ..., MFn. These vectors rotate, for example, counterclockwise, at the angular velocity ω, and thus the cylindrical fields function as the rotating magnetic fields. Further, as seen from FIG. 3, the vectors, indicated by arrows, have phase shifts relative to each other, and the amount of each relative phase shift represents the corresponding x coordinate position. The position detector 23 includes therein an iron core which is sensitive to the magnetic fields and a pick-up coil. However, such an arrangement is already widely known. In this case, there is induced in the pick-up coil, a maximum induced voltage when the vector component is parallel to the axis of the iron core, a minimum induced voltage when the vector component is perpendicular to the axis of the iron core, and a medium induced voltage when the vector component is directed to a direction which is inclined to the axis of the iron core. Consequently, the amount of the phase shift of the vector component, which is directly related to the x coordinate, can be detected by measuring the variation of the level of the induced voltage.

Returning to the graph of FIG. 4, the curve 41, indicating the experimental results, shows, as a whole, relatively good linearity. The curve 41 does, however, have relatively small undulations thereon. Of course, such undulations have a negative effect on the accuracy of the coordinate reading operation. Therefore, it was attempted to reshape the curve 41 to be a nearly straight line.

Figure 5:
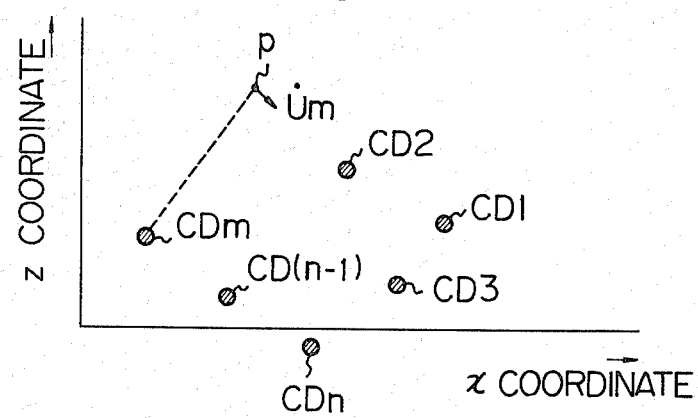
FIG. 5 illustrates an arrangement of a plurality of conductors, used for explaining the nonlinear curve shown in FIG. 4.

In order to obtain such a straight line, regarding the curve 41, the inventor of U.S. Pat. No. 4,418,242 conducted the following fundamental study. First, a plurality of conductors $CD_1$, $CD_2$, $CD_3$, ..., $CD_{(n-1)}$, $CD_n$, ..., $CD_m$ are arranged in a space as shown in FIG. 5. FIG. 5 illustrate an arrangement of a plurality of conductors, used for explaining the nonlinear curve 41 shown in FIG. 4. Certain coordinates are defined with respect to conductors $CD_1$, $CD_2$, $CD_3$, ..., $CD_{(n-1)}$, $CD_n$, ..., $CD_m$. One of the coordinates is an x coordinate and the other a z coordinate. This x coordinate is similar to the aforesaid x coordinate, but the z coordinate is a coordinate which extends perpendicularly from the surface of the tablet 21 (FIG. 2, FIG. 3). In this case, the conductors extend in a direction perpendicular to the surface of the drawing.

In these conductors $CD_1$, $CD_2$, ..., $CD_m$, currents $I_1$, $I_2$, ..., $I_m$ are supplied to flow in the respective conductors. A magnetic-field vector $H_m$ which is induced by the current $I_m$ flowing through the conductor $CD_m$ is represented by the following equation (1):

$$\dot{H}_m = \frac{I_m \cdot \dot{U}_m}{2\pi \sqrt{(x_m - x_0)^2 + (z_m - z_0)^2}} \quad (1)$$

where, $x_m$ and $z_m$ denote the position coordinates on which the conductor $CD_m$ is located; $\dot{U}_m$ denotes a unit vector which extends in a direction of a tangent line from a circle at a point p located on the circle, which circle is one of coaxial circles having the center of $CD_m$; and $x_0$ and $z_0$ denote the x position coordinate and z position coordinate of the point p, respectively. It should be recognized that $(x_0, z_0)$ correspond to the coordinates at which the end of the position detector 23 is located.

On the other hand, a magnetic field $\dot{H}$ is represented by the following equation (2), which field $\dot{H}$ is a composite magnetic field of the magnetic fields which are induced by the currents $I_1$ to $I_n$ flowing through the conductors $CD_1$ to $CD_n$, respectively.

$$\dot{H} = \sum_{m=1}^{n} \dot{H}_m \quad (2)$$

The above-recited equation (1) can be rewritten as the following equation (3), where the unit vector $\dot{U}_m$ is expressed by unit vectors $\dot{x}$ and $\dot{z}$ which are defined along, respectively, the x coordinate and the z coordinate.

$$\dot{H}_m = \frac{I_m\{\dot{x}(z_m - z_0) - \dot{z}(x_m - x_0)\}}{2\pi\{(x_m - x_0)^2 + (z_m - z_0)^2\}} \quad (3)$$

Further, the composite magnetic field $\dot{H}$, at an arbitrary point p, can be represented by the following equation (4), by using the above-recited equation (2).

$$\dot{H} = \dot{x}\sum_{m=1}^{n}\frac{I_m(z_m - z_0)}{2\pi\{(x_m - x_0)^2 + (z_m - z_0)^2\}} - \dot{z}\sum_{m=1}^{n}\frac{I_m(x_m - x_0)}{2\pi\{(x_m - x_0)^2 + (z_m - z_0)^2\}} \quad (4)$$

The equation (4) can further be rewritten as the following equation (5) by introducing the current $I_m$ into the equation (4), where the current $I_m$ is expressed by the expression.

$$I_m = A_m\sin(\omega t + \phi_m) \quad (5)$$
$$= A_m\sin\omega t \cos\phi_m + A_m\cos\omega t \sin\omega_m$$

(where, $\phi_m$ denotes a phase).

that is, $$\dot{H} = \dot{x}\left[\sin\omega t \cdot \sum_{m=1}^{n}\frac{A_m\cos\phi_m(z_m - z_0)}{2\pi\{(x_m - x_0)^2 + (z_m - z_0)^2\}} + \cos\omega t \cdot \sum_{m=1}^{n}\frac{A_m\sin\phi_m(z_m - z_0)}{2\pi\{(x_m - x_n)^2 + (z_m - z_0)^2\}}\right] - \dot{z}\left[\sin\omega t \cdot \sum_{m=1}^{n}\frac{A_m\cos\phi_m(x_m - x_0)}{2\pi\{(x_m - x_0)^2 + (z_m - z_0)^2\}} + \cos\omega t \cdot \sum_{m=1}^{n}\frac{A_m\sin\phi_m(x_m - x_0)}{2\pi\{(x_m - x_0)^2 + (z_m - z_0)^2\}}\right]$$

Further, the equation (5) can be rewritten as the following equation (6) by taking into consideration that, generally, the relationship $$A\sin x + B\cos X = \sqrt{A^2 + B^2} \cdot \sin(X + Y)$$

$$\left(\text{where } Y = \arctan(B/A) - \frac{\pi}{2} + \frac{\pi}{2} \cdot \frac{A}{|A|}\right)$$

exists, that is:

$$\dot{H} = \dot{x}\frac{K_x}{2\pi}\sin(\omega t + \theta_x) - \dot{z}\cdot\frac{K_z}{2\pi}\sin(\omega t + \theta_z) \quad (6)$$

Where, $K_x$, $K_z$, $\theta_x$, and $\theta_z$ are, respectively, expressed by the following expressions:

$$K_x = \sqrt{(A_x)^2 + (B_x)^2}$$

$$K_z = \sqrt{(A_z)^2 + (B_z)^2}$$

$$\theta_x = \arctan\left(\frac{B_x}{A_x}\right) + \frac{\pi \cdot A_x}{2\cdot|A_x|} - \frac{\pi}{2}$$

$$\theta_z = \arctan\left(\frac{B_z}{A_z}\right) + \frac{\pi \cdot A_z}{2\cdot|A_z|} - \frac{\pi}{2}$$

Where, $$A_x = \frac{A_m\cos\phi_m(z_m - z_0)}{(x_m - x_0)^2 + (z_m - z_0)^2}$$

$$B_x = \sum_{m=1}^{n} \frac{A_m\sin\phi_m(z_m - z_0)}{(x_m - x_0)^2 + (z_m - z_0)^2}$$

$$A_z = \frac{A_m\cos\phi_m(z_m - z_0)}{(x_m - x_0)^2 + (z_m - z_0)^2}$$

$$B_z = \frac{A_m\sin\phi_m(x_m - x_0)}{(x_m - x_0)^2 + (z_m - z_0)^2}$$

Thus, the magnetic-field vector $\dot{H}$, at an arbitrary point on the x-z coordinates, can be expressed by the above-recited equation (6). However, it may be very difficult to imagine immediately, from the equation (6), how the magnetic field is actually formed above the tablet.

Figure 6:
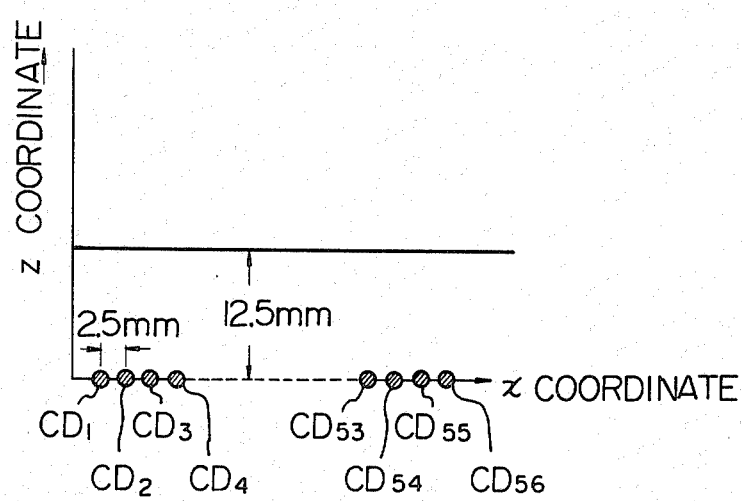
FIG. 6 illustrates an arrangement of a plurality of conductors, used for explaining the principle of the present invention.

In order to imagine the actual form of the magnetic field, some experimentation had been conducted. First, 56 conductors $CD_1$, $CD_2$, ..., $CD_{56}$ were arranged in single file along the x coordinate as shown in FIG. 6. FIG. 6 is a schematic diagram of an arrangement of a plurality of conductors, used for explaining the principle of U.S. Pat. No. 4,418,242. The distance between the pick-up coil and the single file of the conductors was, for example, 12.5 mm and the distance between each two adjacent conductors was, for example, 2.5 mm. Next, the currents $I_1$, $I_2$, ..., $I_{56}$, for reforming the curve 41, including the aforesaid undulations, to a nearly straight line, were investigated with the aid of a computer, based on the above-recited equation (6). As a result of this investigation, the following table was obtained, which table indicates an amplitude of each of the currents $I_1$ to $I_{56}$, flowing respectively through the conductors $CD_1$ to $CD_{56}$, (corresponding to $A_m$ in some of the above-recited equations) and also a phase of each of these currents $I_1$ to $I_{56}$ (corresponding to $\Phi_m$ appearing in some of the above-recited equations).

TABLE

| CD | $A_m$ | m |
|---|---|---|
| $CD_1$, $CD_2$, $CD_3$, $CD_4$ | 1 | 0° |
| $CD_6$, $CD_8$, $CD_{10}$, $CD_{12}$ | −1 | 0° |
| $CD_5$, $CD_7$, $CD_9$, $CD_{11}$ | 1 | 30° |
| $CD_{14}$, $CD_{16}$, $CD_{18}$, $CD_{20}$ | −1 | 30° |
| $CD_{13}$, $CD_{15}$, $CD_{17}$, $CD_{19}$ | 1 | 60° |
| $CD_{22}$, $CD_{24}$, $CD_{26}$, $CD_{28}$ | −1 | 60° |

TABLE-continued

| CD | $A_m$ | m |
|---|---|---|
| $CD_{21}$, $CD_{23}$, $CD_{25}$, $CD_{27}$ | 1 | 90° |
| $CD_{30}$, $CD_{32}$, $CD_{34}$, $CD_{36}$ | −1 | 90° |
| $CD_{29}$, $CD_{31}$, $CD_{33}$, $CD_{35}$ | 1 | 120° |
| $CD_{38}$, $CD_{40}$, $CD_{42}$, $CD_{44}$ | −1 | 120° |
| $CD_{37}$, $CD_{39}$, $CD_{41}$, $CD_{43}$ | 1 | 150° |
| $CD_{46}$, $CD_{48}$, $CD_{50}$, $CD_{52}$ | −1 | 150° |
| $CD_{45}$, $CD_{47}$, $CD_{49}$, $CD_{51}$ | 1 | 180° |
| $CD_{53}$, $CD_{54}$, $CD_{55}$, $CD_{56}$ | −1 | 180° |

Figure 7A:
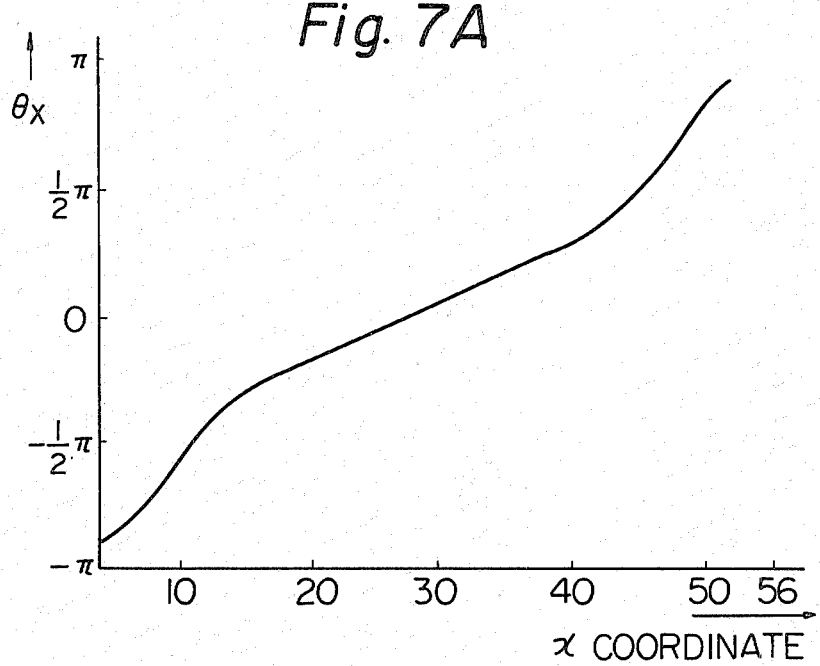
FIG. 7A is a graph indicating the result of the arithmetic operation for obtaining a relationship between the x coordinate and the phase $\theta_x$ of the magnetic-field vector existing above the x coordinate under an arrangement of FIG. 6.
Figure 7B:
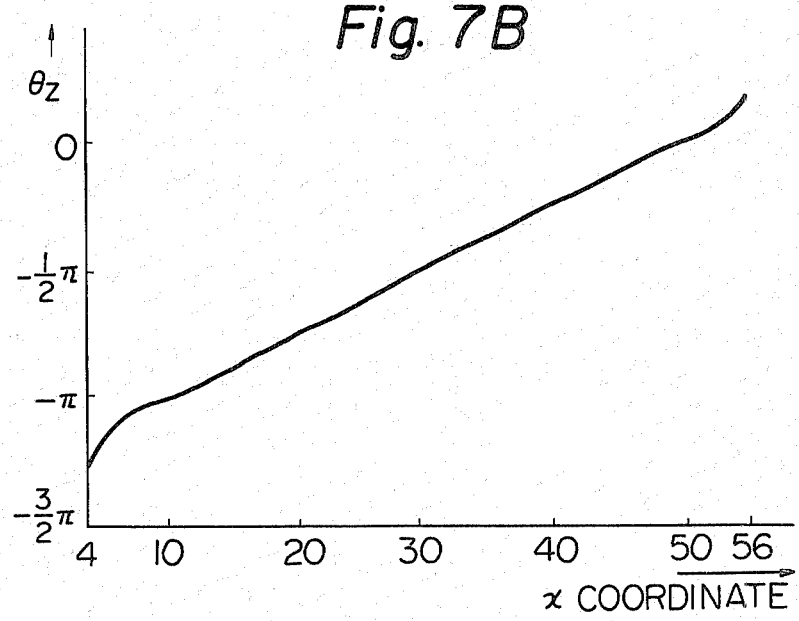
FIG. 7B is a graph indicating the result of the arithmetic operation for obtaining a relationship between the x coordinate and the phase $\theta_z$ of the magnetic-field vector existing above the x coordinate.

The phase $\theta_x$ (corresponding to the angle of the magnetic-field vector regarding the component parallel to the x coordinate axis) and the phase $\theta_z$ (corresponding to the angle of the magnetic-field vector regarding the component parallel to the z coordinate axis), both included in the analog electric signal from the position detector 23, can be derived from an arithmetic operation. In deriving that operation first, 56 conductors $CD_1$ to $CD_{56}$ are arranged in a layout as shown in FIG. 6, second, currents, which satisfy the conditions ($A_m$, $\theta_m$) indicated in the above-recited table, are supplied to respective conductors, third, the position detector 23 is located on the x coordinate (corresponding to the surface of the tablet), and fourth, the position detector 23 is continuously moved from right to left and from left to right in the x coordinate direction. The results of the above-mentioned arithmetic operation are shown in the graphs of FIGS. 7A and 7B. FIG. 7A is a graph indicating the result of the arithmetic operation for obtaining a relationship between the x coordinate and the phase $\theta_x$ of the magnetic-field vector existing above the x coordinate under the arrangement of FIG. 6. FIG. 7B is a graph indicating the result of the arithmetic operation for obtaining a relationship between the x coordinate and the phase $\theta_z$ of the magnetic-field vector existing above the x coordinate. According to the graphs of FIGS. 7A and 7B, it can be expected that the phase of the analog electric signal varies, with relatively good linearity, with respect to a variation of the x coordinate. Further it can be recognized that the phase $\theta_x$ of FIG. 7A is shifted by $(\pi/2)$ compared to the phase $\theta_z$ of FIG. 7B. This indicates that the magnetic-field vectors are rotating. Accordingly, it is proved that the above-mentioned rotating magnetic fields are actually formed above the tablet. It should be recognized that the numbers, indicated along the abscissas of the graphs, correspond to the positions (1, 2, ..., 56) of the conductors ($CD_1$, $CD_2$, ..., $CD_{56}$) shown in FIG. 6.

Next, how the relationships and conditions, indicated in the above-recited table, can actually be satisfied, will be explained in detail. For the purpose of simplifying the explanations, the following descriptions will be made by taking, as an example, a case where only three sets of conductors exist, each of which sets is comprised of both the magnetic-field generating coil and a corresponding alternating signal source. Although the rotating magnetic fields can be formed by only three such sets, at a minimum, seven sets are employed as an example.

The alternating signal sources 35, 36, and 37 produce the following three outputs, respectively.

$$A_1 \sin(\omega t + 0)$$

$$A_2 \sin\left(\omega t + \frac{\pi}{2}\right)$$

$$A_3 \sin(\omega t + \pi)$$

Figure 8:
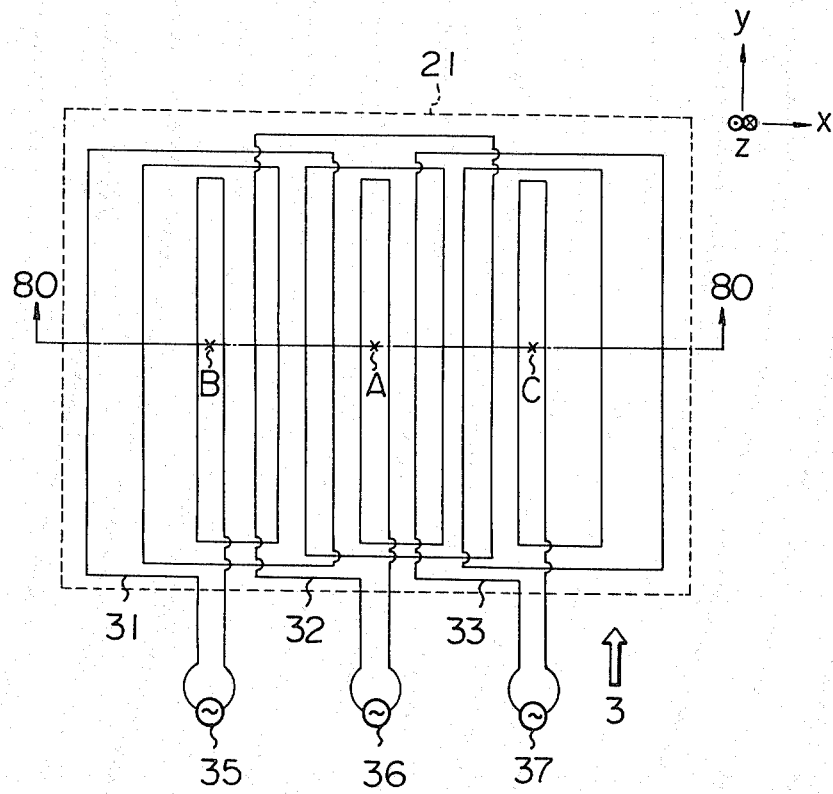
FIG. 8 is a plan view of the magnetic-field generating coils shown in FIG. 3.

In this case, a reference phase is defined by the phase of the output analog electric signal from the position detector 23 (FIG. 3) when the detector 23 is located on the tablet 21 (FIG. 3) at the position facing the magnetic-field generating coil 31. Then, the phase of the output analog electric signal is shifted by $+\frac{1}{2}\pi$ with respect to the reference phase when the position detector 23 is located at the position facing toward the magnetic-field generating coil 32. Similarly, the phase is shifted by $+\pi$ when located at the position facing toward the magnetic-field generating coil 33. Accordingly, the phase is shifted by $+\frac{1}{4}\pi$ when located at a middle position, on the tablet, between the magnetic-field generating coils 31 and 32, similarly, the phase is shifted by $+\frac{3}{4}\pi$ when located, on the tablet, at a middle position between the magnetic-field generating coils 32 and 33. Thus, the phase of the analog electric signal from the position detector 23 varies such as 0, $\frac{1}{4}\pi$, $(2/4)\pi$, $\frac{3}{4}\pi$, $\pi$, ..., with respect to the reference phase, in accordance with the variation of the x coordinate on which the detector 23 is located. In this case, the magnetic-field generating coils 31, 32, and 33 are arranged with a particular pattern. FIG. 8 is a plan view of the magnetic-field generating coils 31, 32, 33 shown in FIG. 3. It should be understood that FIG. 8 is a plan view seen from a position located directly above the tablet 21 of FIG. 3. This arrangement will further be clarified with reference to the coordinate axes of x, y, and z indicated at the right top of FIG. 8. In short, the view seen from an arrow 3 of FIG. 8 corresponds to the view of FIG. 3, but the coil 34 of FIG. 3 is not illustrated in FIG. 8. A cross-sectional view, taken along a line 80—80 shown in FIG. 8, corresponds to the view of FIG. 6. The particular pattern of the coils shown in FIG. 8 has the following features. First, each of the magnetic-field coils has a plurality of turns and these turns are wound in a spiral-like shape. Second, each of the magnetic-field coils is distributed on the same flat plane. Third, some of the turns of one magnetic-field generating coil are introduced between some of the turns of another adjacent magnetic-field generating coil. In other words, the magnetic-field generating coils are arranged along the x coordinate axis and partially overlapped by the adjacent magnetic-field generating coil. In this case, each of the turns is preferably formed in a rectangular spiral shape. It should be noted that the magnetic-field generating coils are electrically insulated from each other. Therefore, each of the crossover points between the turns must be prevented from being electrically shorted, by fabricating, for example a through hole so as to bypass the crossover point. Alternately, a thin insulation layer can be inserted between each two adjacent magnetic-field generating coils so as to prevent the occurrence of such an electric short.

Figure 9A:
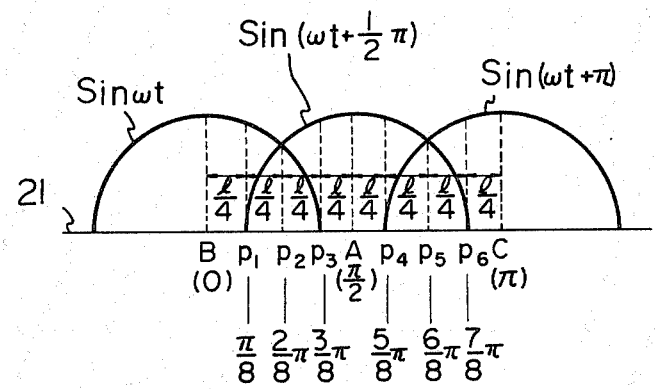
FIG. 9A depicts the distribution of the magnetic fields seen from the points shown in FIG. 8.
Figure 9B:
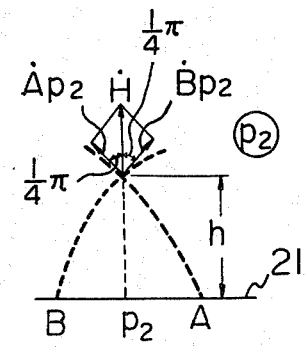
FIG. 9B is a graph used to explain how the magnetic field above a point of FIG. 9A is created.

The magnetic fields, created on and above the tablet 21 of FIG. 8, will be explained with reference to FIGS. 9A and 9B. FIG. 9A depicts a distribution of the magnetic fields seen from points A, B, and C shown in FIG. 8. FIG. 9B is a graph used for explaining how the magnetic field, above a point p2 of FIG. 9A, is created. It should be understood that the points A, B, and C represent center positions of the magnetic-field generating coils 31, 32, and 33, respectively. Regarding the alternating currents $A_1 \sin(\omega t+0)$, $A_2 \sin(\omega t+\frac{1}{2}\pi)$ and $A_3 \sin(\omega t+\pi)$, produced respectively from the alternating signal sources 35, 36, and 37 to be applied, respectively, to the magnetic-field generating coils 31, 32, and 33, the amplitudes of these currents are preferably the same value, so that $A_1 = A_2 = A_3$.

In FIG. 9A, the distance between the points A and B is selected to be l, and the distance is divided evenly into four parts (l/4) at points p1, p2, and p3. The distance between the points A and C is also evenly divided into four parts (l/4) at points p4, p5, and p6. The phases of the magnetic-field vectors, with respect to the reference phase, at respective points, above the tablet 21 with a height of h and corresponding to these points (B, p1 to p3, A, p4 to p6, C), can be expressed as follows:

$B: 0$ $p1: \frac{1}{8}\pi$ $p2: \frac{2}{8}\pi$ $p3: \frac{3}{8}\pi$ $A: \frac{4}{8}\pi$ $p4: \frac{5}{8}\pi$ $p5: \frac{6}{8}\pi$ $p6: \frac{7}{8}\pi$ $C: \pi$ With reference to FIG. 9B, the magnetic-field vector $\dot{H}$, created at an arbitrary point on the setting of FIG. 9A, can be determined by the following procedure, in which the arbitrary point is, for example a point (p2) located above the point p2 with the height of h. The magnetic-field vector $\dot{B}_{p2}$ at the point (p2), induced by the magnetic-field generating coil 31 (having the center B), is advanced in phase by $\frac{1}{4}\pi$ with respect to the phase of the magnetic-field vector $\dot{B}$ induced at the center B. The magnetic-field vector, induced by the magnetic field generating coil, rotates clockwise when viewed in the direction of arrow 3 in FIG. 8. Thus, the phase advances clockwise. In this case, since the magnetic-field vector $\dot{B}$ has a component of $A_0 \sin(\omega t + 0)$, the magnetic-field vector $\dot{B}_{p2}$ has a component of $A_0 \sin(\omega t + \frac{1}{4}\pi)$. Similarly, the magnetic-field vector $\dot{A}_{p2}$ at the point (p2), induced by the magnetic-field generating coil 32 (having the center A), is retarded in phase by $\frac{1}{4}\pi$ with respect to the phase of the magnetic-field vector $\dot{A}$ induced at the center A. In this case, since the magnetic-field vector $\dot{A}$ has a component of $A_0 \sin(\omega t+\frac{1}{2}\pi)$, the magnetic-field vector $\dot{A}_{p2}$ has a component of $A_0 \sin(\omega t+\frac{1}{2}\pi-\frac{1}{4}\pi)$. Thus, the magnetic-field vector $\dot{H}$, at the point (p2), is expressed by an addition of these vectors $\dot{A}_{p2}$ and $\dot{B}_{p2}$ and has a component shown in the following equation (7).

$$A_0 \sin\left(\omega t + \frac{1}{4}\pi\right) - \qquad (7)$$

-continued $$A_0 \sin\left(\omega t + \frac{1}{2}\pi + \frac{1}{4}\pi\right) = K_0 \sin\left(\omega t + \frac{\pi}{4}\right)$$

As understood from the equation (7), the phase of the analog electric signal, produced from the position detector located at the point p2, is shifted by $\frac{1}{4}\pi$ with respect to the reference phase. Therefore, if a phase shift of $\frac{1}{4}\pi$ is detected, it is determined that the position detector is now located at the point p2.

Figure 10:
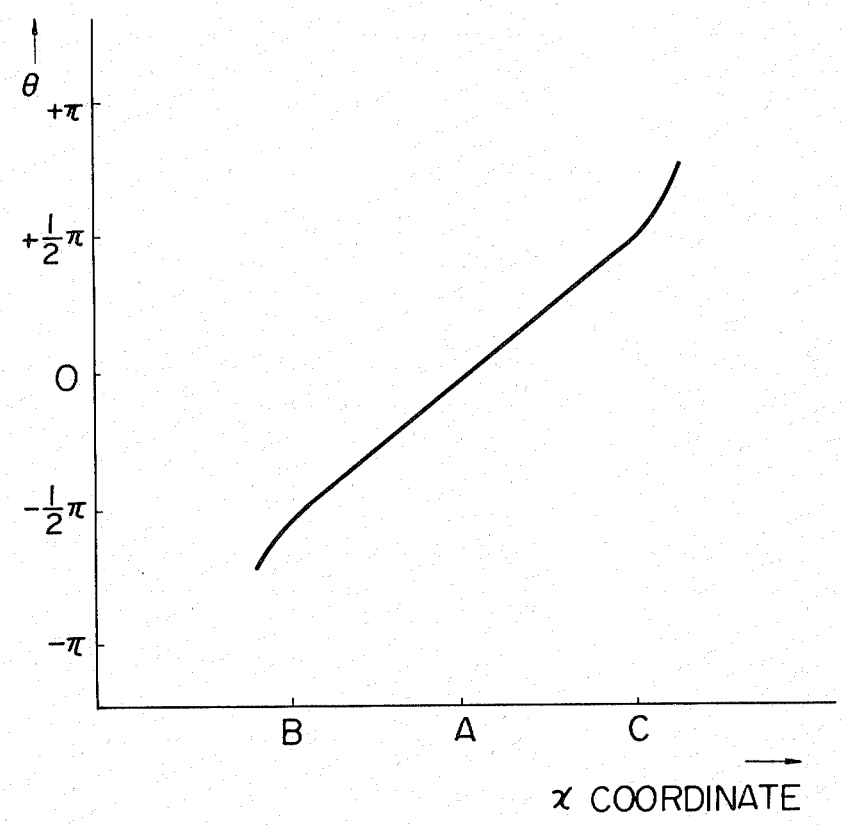
FIG. 10 is a graph showing the variation of the phase of the analog electric signal in accordance with a variation of the x coordinate.

FIG. 10 is the graph illustrating a variation of the phase $\theta$ of the analog electric signal in accordance with a variation of the x coordinate. In the graph, the x coordinates A, B, and C are identical to those shown in FIGS. 8 and 9A. As is apparent from the graph of FIG. 10 the magnetic-field generating coils arranged with the particular pattern of U.S. Pat. No. 4,418,242 as shown in FIG. 8, can provide relatively good linearity, although the linearity is still not that good, that is, the characteristic curve still approximates an S shape.

Figure 11:
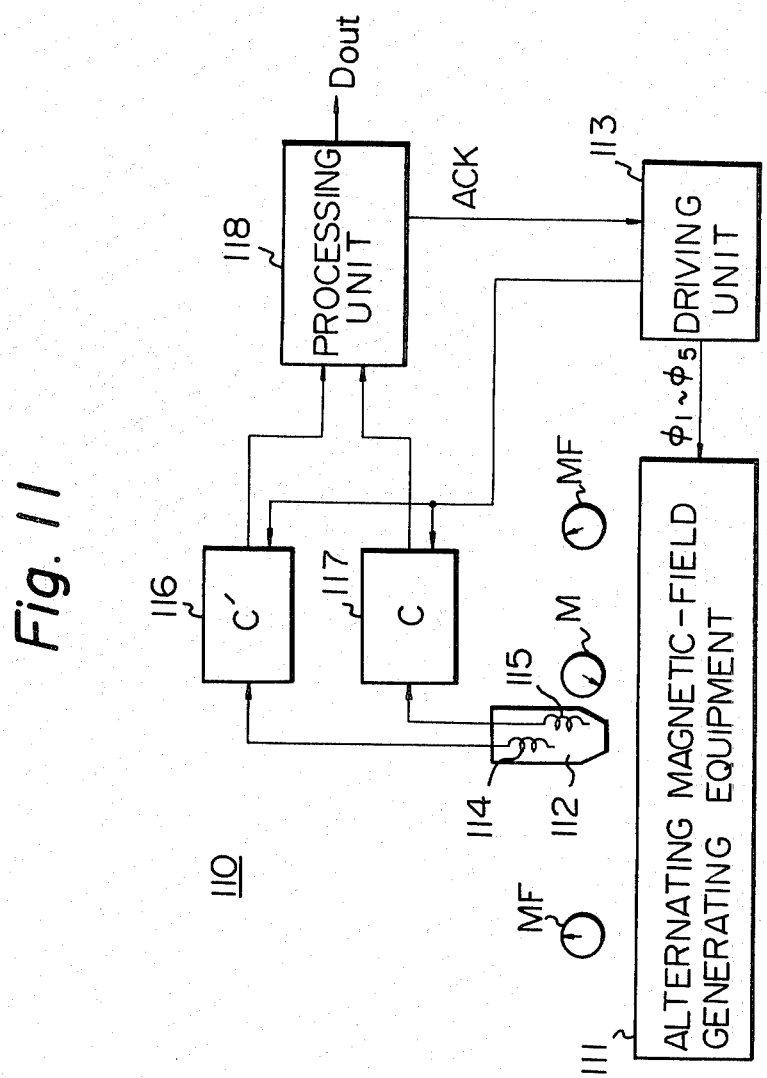
FIG. 11 is a block diagram showing an overall view of a coordinate reading apparatus according to a first embodiment of the present invention.

FIG. 11 is a block diagram of a coordinate reading apparatus 110 according to a first embodiment of the present invention. Reference numeral 111 represents alternating magnetic-field generating equipment identical with part of the previously mentioned equipment 22 in FIGS. 2 and 3. Reference numeral 113 represents a driving unit which supplies to the generating equipment 111 a plurality of driving signals the phases of which are shifted with respect to each other. The driving unit 113 is identical with the alternating signal sources 35 through 38 shown in FIG. 3 if four-phase rotating magnetic fields are to be induced above the tablet (identical to the tablet 21 previously shown). The tablet, not shown in FIG. 11, would be located on the upper surface of the magnetic-field generating equipment 111. Reference numeral 112 represents a magnetic-field detector, in the shape of a pen, identical to the previously mentioned position detector 23. Reference numerals 116, 117, and 118 are blocks which act as parts for processing the output signals from the detector 112 and producing coordinate data output $D_{out}$. As already explained in detail, rotating magnetic fields MF are induced above the tablet mounted on the alternating magnetic-field generating equipment 111. The phases of these fields MF are shifted with respect to each other as schematically indicated by arrows. The position of the pen, i.e., the magnetic-field detector 112, can be determined in accordance with the variation of the phase. The formation of the rotating magnetic fields MF is performed by means of the aforesaid plurality of magnetic-field generating coils included in the magnetic-field generating equipment 111.

Figure 12A:
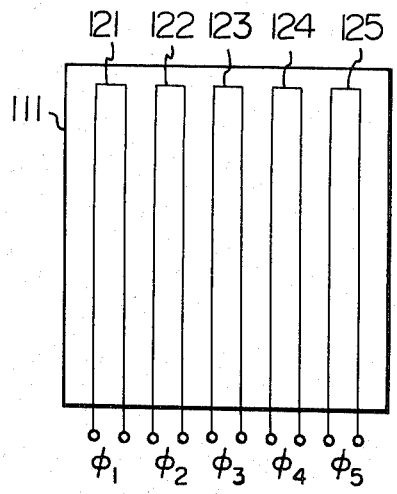
FIG. 12A is a plan view of an arrangement of a plurality of magnetic-field generating coils in the case of a one-dimensional coordinate reading apparatus.

FIG. 12A is a plan view of an arrangement of a plurality of magnetic-field generating coils in the case of a one-dimensional coordinate reading apparatus. Each coil is illustrated as a single turn, however, the coils can be constructed as shown in FIG. 8 (same for FIG. 12B). Reference numerals 121 through 125 represent a plurality of magnetic-field generating coils which receive the driving signals $\phi_1$ through $\phi_5$, the phases of signals $\phi_1$ through $\phi_5$ being shifted with respect to each other.

Figure 12B:
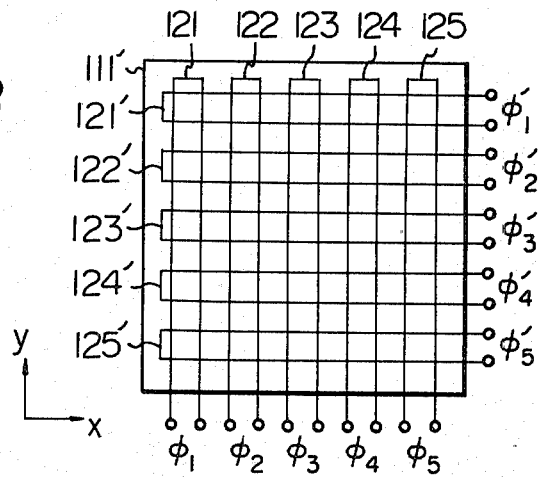
FIG. 12B is a plan view of an arrangement of a plurality of magnetic-field generating coils in the case of a two-dimensional coordinate reading apparatus.

FIG. 12B is a plan view of an arrangement of a plurality of magnetic-field generating coils in the case of a two-dimensional coordinate reading apparatus. Other magnetic-field generating coils 121' through 125' are incorporated in the magnetic-field generating equipment 111'. The coils 121' through 125' are arranged to be perpendicular to the aforesaid coils 121 through 125. The coils 121' through 125' also receive driving signals $\phi_1'$ through $\phi_5'$, respectively, which are similar to the aforesaid driving signals $\phi_1$ through $\phi_5$.

In the following explanation, a one-dimensional coordinate reading apparatus will be used as an example for simplification.

Figure 13:
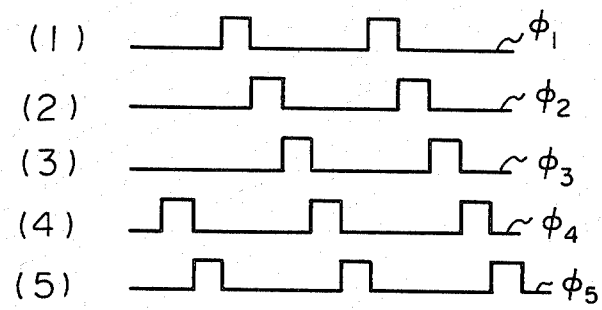
FIG. 13 depicts the waveforms of the driving signals as shown in FIGS. 12A and 12B.

Driving signals having relatively shifted phases are shown in FIGS. 13 (1)–(5) FIG. 13 depicts waveforms of the driving signals $\phi_1$ through $\phi_5$ shown in FIGS. 12A and 12B. Each of these driving signals is produced from the previously mentioned alternating signal source, such as the members 35, 36 . . . illustrated in FIG. 3. As is clear from FIG. 13, the phases of these driving signals are shifted with respect to each other. Due to the shifted phases, as explained hereinbefore in detail, the phases of the rotating magnetic field MF are varied continuously. The relationship between each phase of the field MF and the corresponding position on the tablet should, ideally, be strictly linear. In the past, however, it has been difficult to realize such linearity and, therefore, the desired accuracy in reading could not be obtained.

Figure 14A:
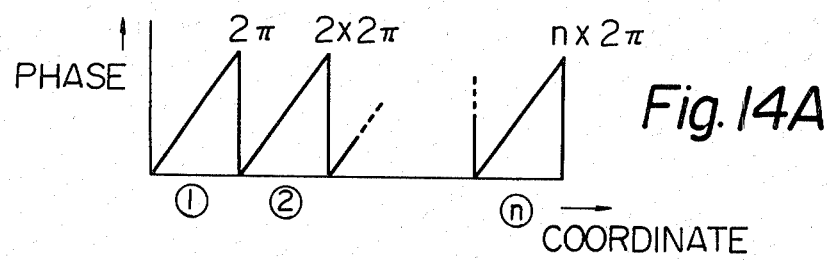
FIGS. 14A, 14B, 14C, and 14D are graphs used to explain the principle of the coordinate reading apparatus according to the present invention.
Figure 14B:
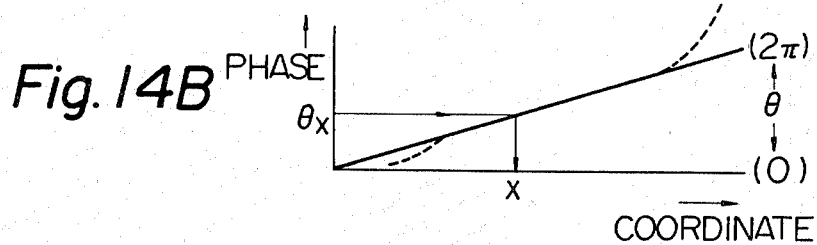

FIGS. 14A, 14B, 14C, and 14D are graphs used for explaining the principle of the coordinate reading apparatus according to the present invention. It should be noticed that the subject of the present invention is well characterized by the graphs of these FIGS. 14A through 14D. Of these figures, the graph depicted in FIG. 14B is identical to the afore-mentioned ideal curve having the best linearity. If linearity can be obtained, a desired position x can be correctly determined according to a detected phase $\theta_x$ which is the phase of the rotating magnetic field MF. In the past, the curve has been approximately S shaped. As a result, undesired undulations were remarkable near both ends of the curve, as seen from the curve indicated by dotted line. Thus, it was difficult to read the position x correctly because it was in an area reaching from one side to the other side of the tablet.

Figure 14C:
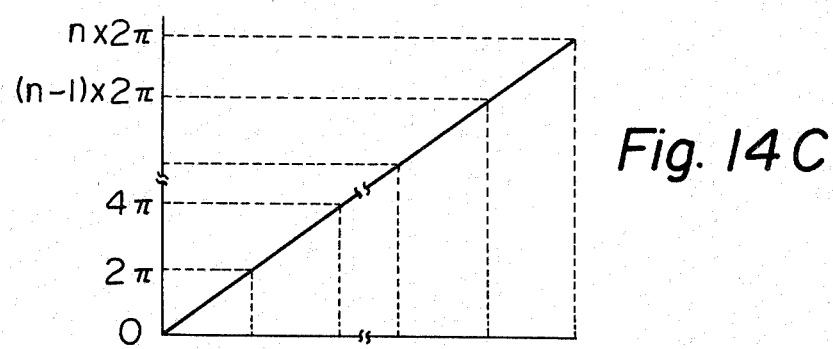

According to the present invention, the n-th order harmonic wave component is used, in addition to the fundamental wave component, for the dotted line curve in FIG. 14B. The fundamental wave component is identical to a cycle, i.e., the frequency f, of each of the driving signals $\phi_1$ through $\phi_5$ shown in FIG. 13. In view of the periodic nature of the driving signals, all with frequency f, multiplied by n, i.e., n×f, (corresponding to the n-th order harmonic) wave component curves, each of which is similar to the curve of FIG. 14B, appear repeatedly n times. Consequently, areas ①, ②, . . . ⓝ are defined on the tablet, as seen from FIG. 14A. A peak of each area indicates a phase shift of $2\pi$. Therefore, the peaks of the n-th order harmonic wave components have the phases $2\pi$, $2\times 2\pi$, . . . $n\times 2\pi$, from the left to the right sequentially. Each of the thus segmented curves (triangle curves in FIG. 14A) has considerably good linearity, compared with the linearity of the dotted line curve shown in FIG. 14B (The reason for this will be mentioned in detail hereinafter). The repetition of the curves, varying with $2\pi$, $2\times 2\pi$, . . . $n\times 2\pi$ sequentially, can be rearranged as shown in FIG. 14C.

The operation of the coordinate reading apparatus according to the present invention is as follows. First, the desired position of the pen (the magnetic-field detector 112) is determined very correctly in any one of the areas ①, ②, ... ⓝ in which the pen is located. In this case, however, it is not clear in which area, among the areas ①, ②, ... ⓝ the pen stands. For this, the fundamental wave component signal, although it does not have good linearity, is utilized. Thus, the fundamental component signal functions, in the present invention, as an assistant signal for the harmonic wave component signal.

Figure 14D:
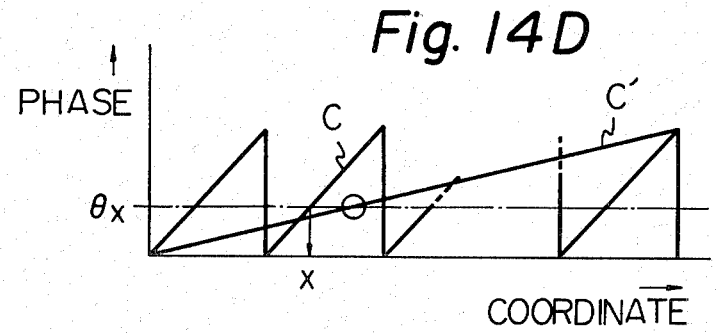

FIG. 14D is a pictorial graph used for further clarifying the principle of the present invention. The desired position of the pen (112) is indicated in phase by the symbol $\theta_x$ (also refer to the chain dotted line). First, the desired position x is very correctly determined by utilizing a curve C defined by the harmonic wave component. Next, it is determined in which area the pen (112) stands by utilizing a curve C' defined by the fundamental wave component (refer to a crosspoint indicated by the symbol O in FIG. 14D). Thus, it is detected where the pen is located and in which area it is positioned, with a very high degree of accuracy.

Returning to FIG. 11, a first pick-up winding 114 and also a second pick-up winding 115 are contained in the magnetic-field detector 112. The first pick-up winding 114 is responsive to the fundamental wave component only, and, thereby, the curve C' of FIG. 14D can be extracted from a first detector (C') 116, as in the coordinate reading apparatus explained with reference to FIGS. 2 through 10. On the other hand, the second pick-up winding 115 is responsive to the n-th order harmonic wave component only, and, thereby, the curve C of FIG. 14D can be extracted from a second detector (C) 117. The processing unit 118 then produces the desired coordinate data output $D_{out}$ based on information of the curves C and C'.

The first pick-up winding 114 is responsive only to the fundamental wave component (for example 4 kHz) of the driving signals. The driving signals have waveforms of square or rectangular shape, as shown by $\phi_1$ through $\phi_5$ in FIG. 13. It is important to note that in general a square or rectangular waveform signal necessarily contains many harmonic wave signals. Therefore, it is not necessary to employ special means for producing the harmonic wave component signal. Such a harmonic wave signal is automatically obtained from the fundamental wave component signal, i.e., the driving signals $\phi_1$ through $\phi_5$. In the present invention, one of a plurality of harmonic wave component signals, for example, the 8-th order harmonic wave component signal, is extracted by the second pick-up winding 115. The 8-th order harmonic wave component signal has a frequency of 32 kHz when the fundamental wave component signal of 4 kHz is used ($4 \times 8 = 32$). Thus, the harmonic wave component important to the present invention is obtained from spontaneous harmonic wave signals by filtering out all but the desired harmonic (8-th order).

In FIG. 11, the pick-up windings 114 and 115 are respectively located at vertically upper and lower levels of the detector 112 (the lower level being at the end of the detector which is placed on the tablet). The reason for this is as follows. Generally, in a coordinate reading apparatus based on the electromagnetic induction method or the electrostatic coupling method, correct reading of the coordinate can be achieved only when the position detector is positioned in such a manner that the detector stands at right angles with respect to the surface of the tablet. It is, however, inconvenient for an operator to always handle the position detector without inclining it with respect to the vertical axis of the tablet. The coordinate reading apparatus such as shown in FIGS. 2 and 11 have the advantages that highly accurate readings are always expected, regardless of the tilt angle of the position detector. This advantage is produced due to the presence of the above-mentioned rotating magnetic fields, which will be clarified with reference to FIG. 15.

Figure 15:
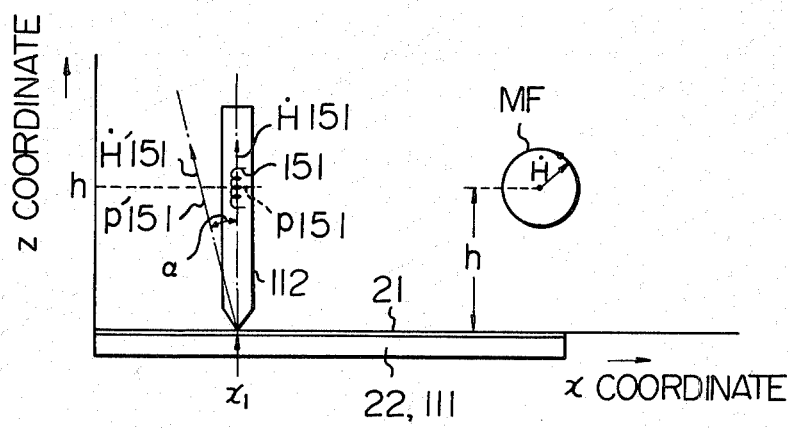
FIG. 15 is a schematic diagram used for explaining the advantages of the coordinate reading apparatus of the rotating magnetic field type.

FIG. 15 is a diagram, used for explaining an advantage of the coordinate reading apparatus of the rotating magnetic field type. In FIG. 15, the rotating magnetic field MF exists above the tablet 21. It should be understood that, in this figure, although a great number of rotating magnetic fields exist along the x coordinate axis with variations of the phases of the vector components, only one rotating magnetic field MF is illustrated as an example. The magnetic-field vector is represented by the symbol $\vec{H}$ having a magnitude of $H_0$. The vector $\vec{H}$ can be broken into two orthogonal components $H_x$ and $H_z$ which are expressed by the following equations (8) and (9).

$$H_x = H_0 \cos(\omega t + ax) \quad (8)$$

$$H_z = H_0 \sin(\omega t + ax) \quad (9)$$

In this FIG. 15, the center of the magnetic-field vector $\vec{H}$ is located above the tablet 21 at the height of h which represents the distance between the end of the detector 112 and a pick-up winding 151 (an iron core which is part of the winding 151 is not illustrated) included in the detector 112.

In the above recited equations (8) and (9), the phase component ax is equivalent to the above-mentioned phase $\theta$ and, accordingly ax will continuously vary, such as 0, $\pi/4$, $\pi 2 \cdots$.

The location of the above-mentioned pick-up winding 151, that is, the height h, is expressed, in general, as a variable z along the z coordinate axis. Thus, the magnetic-field vector $\vec{H}$, at the location of the pick-up winding, should be modified by using the variable z. In this case, the variation of the variable z corresponds to the variation of the vector component in the phase of the magnetic-field vector. That is, the variation z is developed as a phase variation factor f(z) proportional to the value of the variable z in relation to the height h. As a result, the above-recited equations (8) and (9) can be rewritten, in general, as the following equations (10) and (11).

$$H_x = H_0 \cos(\omega t + ax + f(z)) \quad (\text{``a'' is a phase deviation}) \quad (10)$$

$$H_z = H_0 \sin(\omega t + ax + f(z)) \text{ ratio, ``x'' is the x coordinate} \quad (11)$$

The pick-up winding 151 therefore produces an analog electric signal having a voltage amplitude $V_p$ which is proportional to the value $H_z$ of the equation (11). This is because the pick-up winding 151 is positioned so as to be responsive only to the magnetic-field component along the z coordinate axis. Thus, an analog electric signal is produced which has a voltage amplitude $V_p$. The amplitude $V_p$ is expressed by the following equation (12):

$$V_p = \beta H_0 \sin(\omega t + ax_1 + f(h)) \quad (12)$$

where, the symbol $\beta$ denotes a magnetic field-voltage transducing coefficient of the pick-up winding 151. The symbols ($x_1$, h) denote the x-z coordinates indicating the location of the pick-up winding 151.

The above recited equation (12) is satisfied in the case where the detector 112 stands at right angles on the tablet 21. Accordingly, the equation (12) is not satisfied in a case where the detector 112 stands on the tablet 21 at a tilt angle $\alpha$ (radian). The latter case will be considered below, wherein the voltage amplitude of the analog electric signal from the pick-up winding 151 is represented by a symbol $V_p'$. To be more specific, it is important to know how the voltage amplitude of the signal changes from $V_p$ to $V_p'$ when the pick-up winding 151 moves from a position p151 to a position p'151. The following equation (13) expresses the value of the voltage amplitude $V_p'$ at the latter position p'151.

$$V_p' = \beta H_0\{\sin(\omega t + ax_1 - ah\sin\alpha + f(h\cos\alpha))\cos\alpha + \cos(\omega t + ax_1 - ah\sin\alpha + f(h\cos\alpha))\sin\alpha\} \quad (13)$$
$$= \beta H_0 \sin(\omega t + ax_1 - ah\sin\alpha + f(h\cos\alpha) + \alpha)$$

Next, the difference between the amplitude $V_p$ of the equation (12) and the amplitude $V_p'$ of the equation (13), that is ($V_p - V_p'$), will be expressed by the following equation (14).

$$V_p - V_p' = f(h) + ah\sin\alpha - f(h\cos\alpha) - \alpha \quad (14)$$

In the coordinate reading apparatus of the present invention the voltage amplitudes $V_p$ and $V_p'$ should be the same even though the pick-up winding 151 moves from the position p 151 to the position p' 151 and vice versa. In order words, the level of the analog electric signal must always be constant at any tilt angle of the detector 112. In short, regarding the above recited equation (14), $V_p = V_p'$ must be satisfied. As a result, the following equation (15) is obtained.

$$f(h) + ah\sin\alpha - f(h\cos\alpha) - \alpha = 0 \quad (15)$$

If the position of the pick-up winding 151 in the detector is very close to the tablet 21 the level of the analog electric signal from the winding 151 is determined only by the conductor located near the end of the position detector; accordingly, the above-mentioned level varies by large amounts during a continuous movement of the detector 112 along the x coordinate axis. This means that a normal reading of the coordinate data cannot be expected.

If the position of the pick-up winding 151 in the detector 112 is far from the tablet 21, for example, several centimeters thereover, the above-mentioned level varies by a small amount. At the same time, the winding 151 can engage with normal rotating magnetic fields. Under such a normal condition, the following equation (16) is satisfied.

$$f(h) \approx f(h\cos\alpha) \quad (16)$$

Further, the following equation (17) is obtained by taking the above recited equations (15) and (16) into account.

$$ah\sin\alpha - \alpha = 0 \quad (17)$$

Accordingly, the following equation (18) is obtained from equation (17)

$$ah\sin\alpha = \alpha \quad (18)$$

When the tilt angle is small and $\alpha$ varies within a range between 0 (radians) and $\frac{1}{4}\pi$ (radians), the following approximate equation (19) exists.

$$\sin\alpha \approx \alpha \quad (19)$$

Therefore, the following equation will result from (19), by taking the equation (18) into account.

$$a \cdot h \approx 1 \quad (20)$$

In other words, if the values a and h are selected so as to satisfy the approximate relationship $ah \approx 1$, the level of the analog electric signal will be constant even if the tilt angle $\alpha$ of the detector 112 varies between 0 and $\frac{1}{4}\pi$ radians.

From another viewpoint, with reference to FIG. 15, when the pick-up winding 151 is located at the position p 151, the corresponding magnetic-field vector, at the position p 151, is generated in a direction along the arrow H 151 (at this time, the winding 151 produces a signal having the maximum voltage amplitude $V_p$). When the winding 151 is located at the position p' 151, the corresponding magnetic-field vector, at the position p' 151, is generated in a direction along the arrow H' 151 due to the rotation of vector (refer to arrows in MF1, MF2 . . . MFn shown in FIG. 3). Accordingly, the winding 151 can still produce, at the position p' 151, a signal having the same maximum voltage amplitude $V_p'$ which indicates that the edge of the detector 112 is located at the x coordinate x1.

The above-mentioned symbol "a" denotes a factor which is called the phase-deviation ratio. The phase-deviation ratio a is equivalent, in FIG. 10, to a gradient of the straight line between the x coordinates B and C and the gradient of the straight lines shown in FIGS. 14A through 14D, that is ($d\theta/dx$). To be more specific, the value of the ratio "a" is proportional to the pitch with which each two adjacent conductors ($CD_1$, $CD_2$ . . . $CD_{56}$) are arranged (see FIG. 6).

It should be recognized that an operator generally handles the position detector 23 with some tilt angle, as one does when gripping a pencil. Therefore, the z coordinate axis can be defined by taking the tilt angle ($\alpha'$) into account in advance so that equation (18) may be rewritten to read as the following equation (21).

$$ah\sin(\alpha - \alpha') = \alpha - \alpha' \quad (21)$$

Thus, according to the present invention, correct coordinate data reading can always be realized, even if the detector 112 is inclined at any tilt angle, between about 0 (radian) and $\frac{1}{4}\pi$ (radian) if equation (20), $a \cdot h \approx 1$ stands. Consequently, it is preferable to maintain the relationship of $a \cdot h \approx 1$. In other words, the larger the phase-deviation ratio "a" becomes, the lower the height h should be. That is, the location of the pick-up winding must be lowered vertically. Regarding the second pick-up winding 115, the phase-deviation ratio a defined by the signal from this winding 115 is shown in FIG. 14A. Therefore, the ratio "a", defined by the harmonic wave component, is larger than the ratio a, defined by the fundamental wave component of FIG. 14B by n times, for example, 8 times when the 8-th order harmonic wave is used. When the ratio "a" is multiplied by n, i.e., n×a, the height h of the winding 151 can be lowered by 1/n times due to the relationship in the equation a·h≈1. This is the reason why the pick-up windings 114 and 115 are located at upper and lower levels of the detector 112.

The advantage of lowering the location of the pick-up winding will be discussed below. If the pick-up winding is located at a high level, the pick-up winding is electromagnetically coupled with a wide range of the magnetic-field generating coils (refer to 121 through 125 in FIG. 12A). As a result, the irregular distribution of these coils has a detrimental effect on the accuracy of the output $D_{out}$ in the case where the detector 112 is positioned near either side of the tablet. This irregular distribution means that the detector couples with a very small number of coils near the sides of the tablet. And the nonlinear curve indicated by the dotted line in FIG. 14B is produced. In other words, the lower the location of the pick-up winding, the smaller the above-mentioned detrimental effect on the accuracy due to the irregular distribution of the coils, even if the detector 112 is positioned near the side of the tablet. Each curve shown in FIG. 14A has good linearity because they are derived from a signal which is obtained from the pick-up winding 115 located at a vertically lower level in the detector 112.

It may be concluded that it is preferable to delete the pick-up winding 114 located at the vertically upper level in the detector 112. The winding 114 cannot, however, simply be removed from the detector 112 because it functions as part of the coordinate reading apparatus. The winding 114 can only be deleted if something exists to perform the same function as the winding 114. Ideally this would be the pick-up winding 115. To be specific, it is ideal if the winding 115, located at the vertically lower level in the detector 112, deals with not only the n-th harmonic wave component but also the fundamental wave component.

Figure 16:
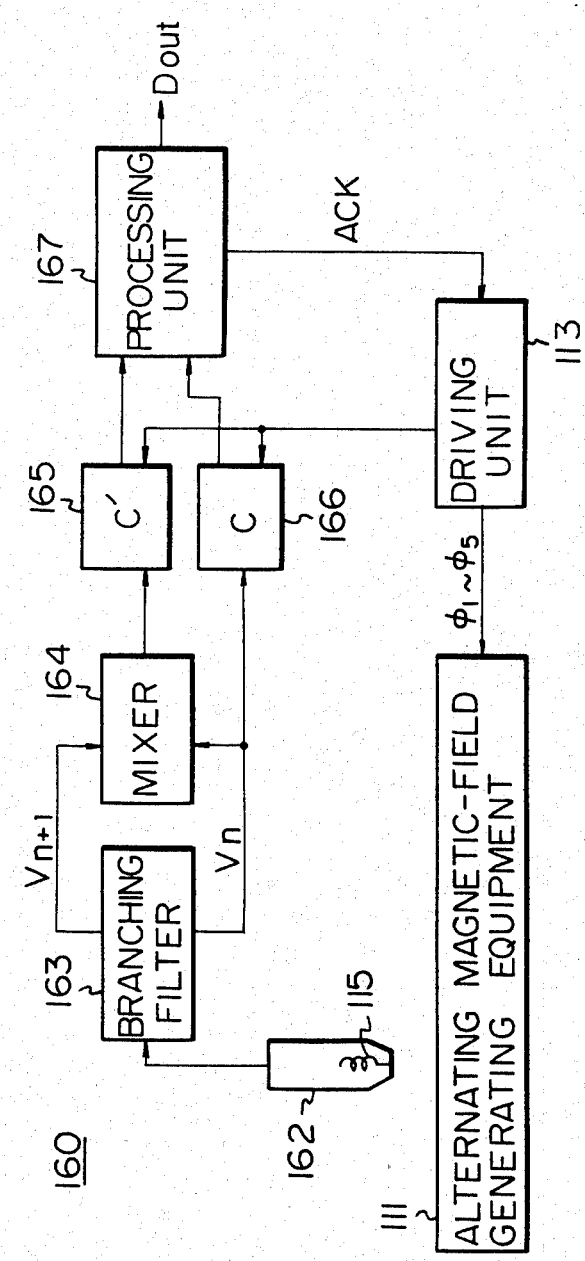
FIG. 16 is a block diagram of a coordinate reading apparatus according to a second embodiment of the present invention.

FIG. 16 is a block diagram illustrating an overall view of a coordinate reading apparatus according to a second embodiment of the present invention. It is important to know that the coordinate reading apparatus 160 of the second embodiment does not include, in the magnetic-field detector 162, a winding similar to the pick-up winding 114 shown in FIG. 11 and that the pick-up winding 115 exists therein at the vertically lower level. Since the single pick-up winding 115 is located at a lower level, the signal produced therefrom produces good linearity. Since the winding 115 deals with only the n-th order harmonic wave component, as in the first embodient of FIG. 11, the fundamental wave component must be created by a suitable means, which will be described below.

Regarding output from the winding 115, both the n-th order harmonic wave component and (n+1)-th order harmonic wave component of the output are taken into consideration. The n-th order and (n+1)-th order of the output indicated by symbols $v_n$ and $v_{n+1}$, are expressed by the following equations (22) and (23), respectively.

$$v_n = A_n \sin n(\omega t + \phi) \quad (22)$$

$$v_{n+1} = A_{n+1} \sin \{(n + 1)(\omega t + \phi)\} \quad (23)$$

Here, a product of $v_n$ and $v_{n+1}$, i.e., $v_n \cdot v_{n+1}$, is calculated by means of a multiplier or a mixer, which product is expressed by the following equation (24).

$$v_n \cdot v_{n+1} = A_n \cdot A_{n+1} \cdot \sin n(\omega t + \phi) \cdot \sin \{(n + 1)(\omega t + \phi)\} \quad (24)$$

$$= -\frac{1}{2} A_n \cdot A_{n+1} [\cos \{(2n + 1)(\omega t + \phi)\} - \cos (\omega t + \phi)]$$

According to equation (24), a signal of $\cos(\omega t + \phi)$ can be extracted by way of a low pass filter. This signal includes the fundamental wave component $\omega$. In FIG. 16, the reference numeral 163 represents a branching filter producing branched outputs of $v_n$ and $v_{n+1}$. These outputs $v_n$ and $v_{n+1}$ are applied to a mixer 164. The mixed output $(v_n \cdot v_{n+1})$ is applied to a first detector (C') 165. Since the detector 165 contains at least the low pass filter, the signal relating to the curve C' of FIG. 14D is produced therefrom. The signal relating to the curve C of FIG. 14D is produced by a second detector (C) 166, which is similar to the second detector 117 of FIG. 11. The outputs from these detectors 165 and 166 are processed in a processing unit 167, and desired coordinated data output $D_{out}$ is obtained therefrom.

Figure 17:
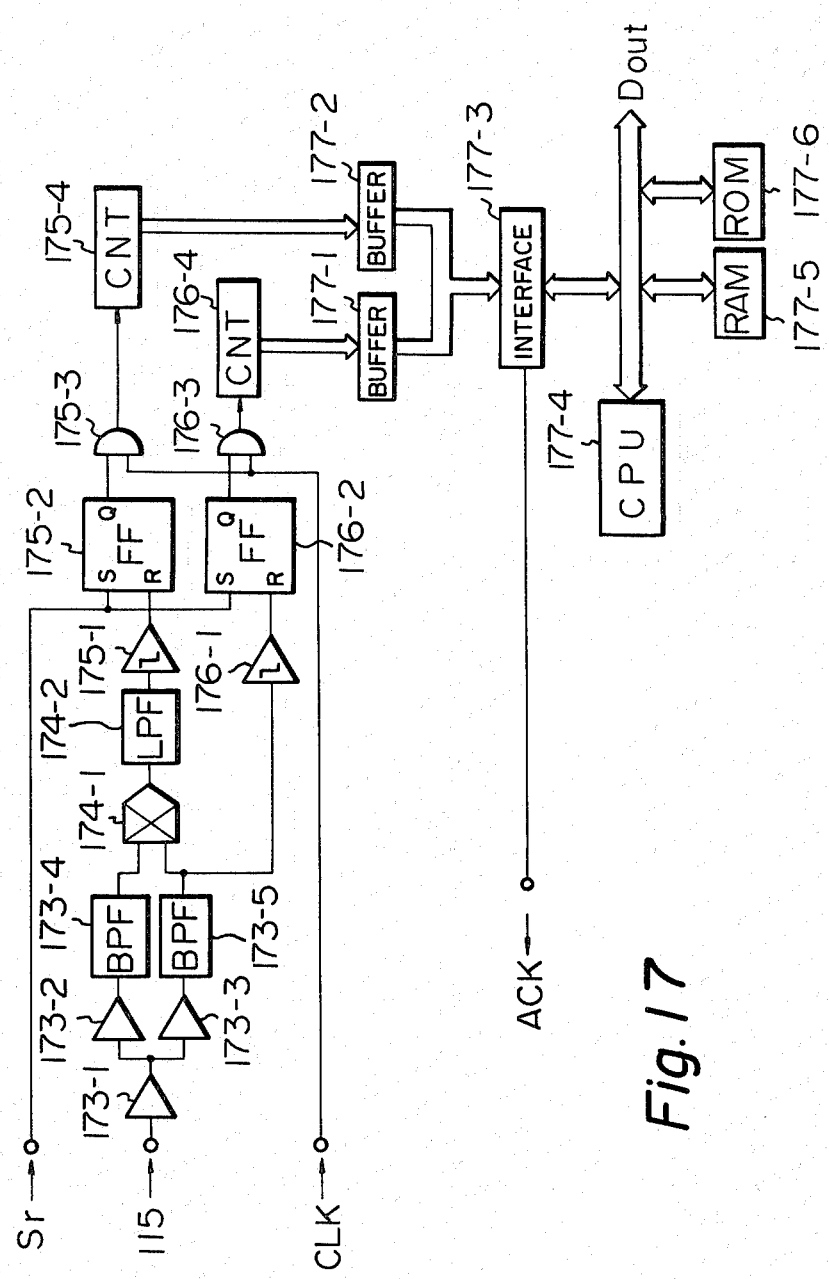
FIG. 17 is an example of a circuit diagram for the block diagram shown in FIG. 16.

FIG. 17 is circuit diagram of one example of a construction of the blocks 163 through 167 shown in FIG. 16. The n-th order and (n+1)-th order harmonic wave component outputs from the pick-up winding 115 (in FIG. 16) are applied to band pass filters 173-4 and 173-5 via amplifiers 173-1, 173-2, and 173-3. The (n+1)-th order output is produced from the filter 173-4 and the n-th order output is produced from the filter 173-5. These (n+1)-th order and n-th order outputs from the filters 173-4 and 173-5 are applied to a mixer 174-1 (corresponding to the mixer 164 of FIG. 16). After mixing these outputs, only the fundamental wave component output (corresponding to the aforesaid component of $\cos(\omega t + \phi)$) is extracted by a low pass filter (LPF) 174-2 and then applied to a reset input (R) of a flip-flop (FF) 175-2 via a comparator 175-1. On the other hand, the n-th order output is applied to a reset input (R) of a flip-flop 176-2 via a comparator 176-1. The comparators 175-1 and 176-1 convert analog sign wave signals into digital outputs of TTL level.

The flip-flops (FF) 175-2 and 176-2 commonly receive, at their set input (S), a reference signal Sr which sets the flip-flops. The reference signal acts as a so-called initializing signal. Accordingly, when the signal Sr is received, the Q-outputs of the flip-flops 175-2 and 176-2 change to the "H" (high) level, and the AND gates 175-3 and 176-3 are opened allowing a clock pulse CLK to pass through these AND gates 175-3 and 176-3. The number of clock pulses CLK passing through these AND gates are counted by counters 175-4 and 176-4, respectively. When the timing of the signal Sr is set to be identical to the phase of 0° the output from the pick-up winding 115 is produced is identical to the phase $\theta_x$ (refer to FIG. 14D) corresponding to the position on the tablet at which the detector 112 is located. Consequently, the value of the phase $\theta_x$, relating to the curve C in FIG. 14D, is counted in the counter 176-4 and the value of the phase $\theta_x$, relating to the curve C' in FIG. 14D, is counted in the counter 175-4. As a result, digital data indicating the position x of FIG. 14D is finally obtained. Thereafter, the obtained digital data is processed with the aid of a computer. The digital data is stored in a random access memory (RAM) 177-5 via three-state buffers 177-1, 177-2 and an interface 177-3. Next, the stored digital data is processed by a central processing unit (CPU) 177-4 in accordance with a program stored in a read only memory (ROM) 177-6. Thus, the desired coordinate data output $D_{out}$ can be obtained.

A signal ACK produced from the interface 177-3 is an acknowledge signal indicating completion of each data generation cycle. The signal ACK is also shown in FIG. 16. Every time the driving unit 113 (FIG. 16) receives the signal ACK, it produces the driving signals in a sequence of $\phi_1 \rightarrow \phi_2 \ldots \rightarrow \phi_5 \rightarrow \phi_1 \rightarrow \ldots$.

Figure 18:
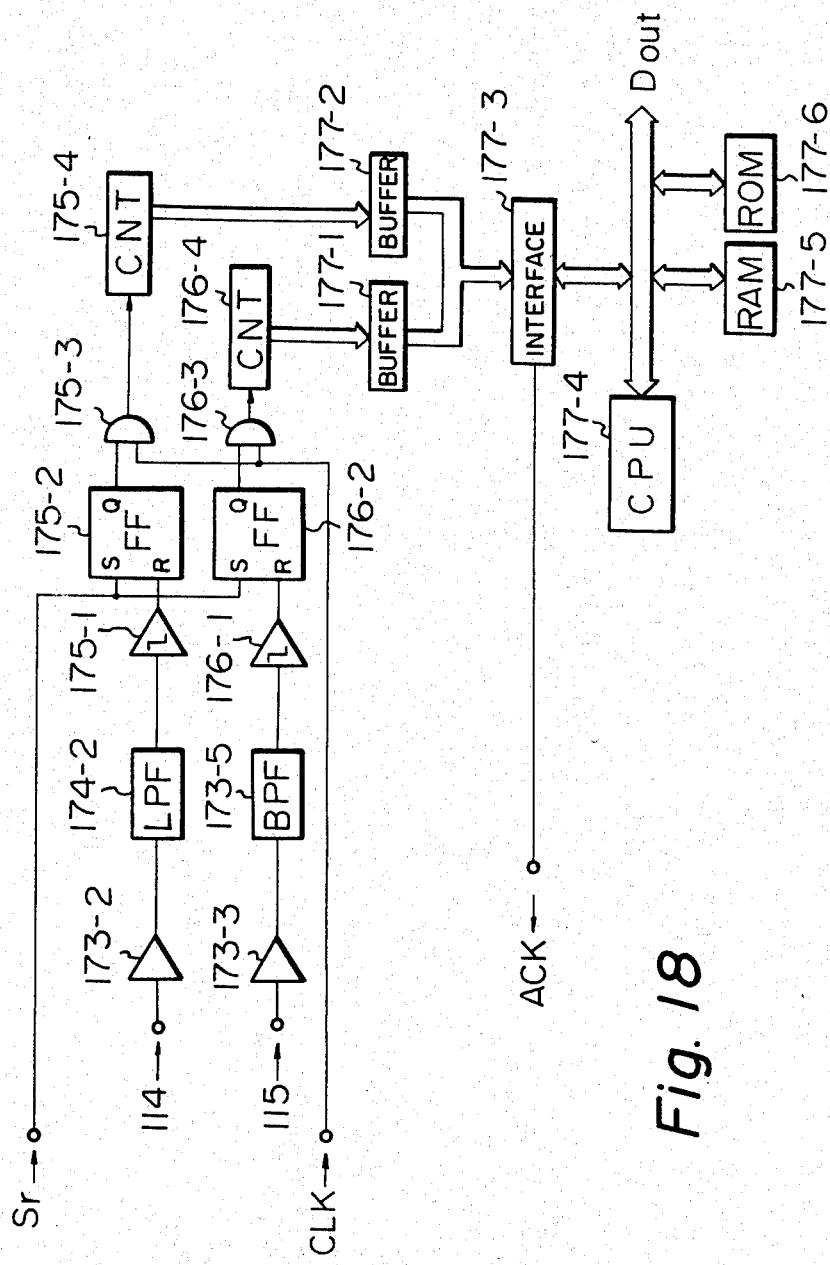
FIG. 18 is an example of a circuit diagram for the block diagram shown in FIG. 11.

FIG. 18 is a circuit diagram of one example for constructing blocks 116 through 118 shown in FIG. 11. In FIG. 18, the components which are the same as those of FIG. 17 are represented by the same reference numerals or symbols. The difference between FIGS. 17 and 18 resides in that, in FIG. 18, there are two input paths independent from each other for receiving outputs from the windings 114 and 115, respectively. The operation of FIG. 18 is substantially the same as that of FIG. 17.

As explained above in detail, the coordinate reading apparatus can read the desired position of the pen with very high degree of accuracy on the tablet from one side to the other side.

We claim:

1. A coordinate reading apparatus, comprising:
a tablet having magnetic-field generating coils and positions on said tablet defined by coordinate axes;
a magnetic-field detector, responsive to magnetic fields induced by said magnetic-field generating coils, having a detecting end and a lower level at said detecting end, for generating an analog electric signal corresponding to a desired position to be read on said tablet; and
a processing unit, operatively connected to said magnetic-field detector and said tablet, for receiving said analog electric signal from said magnetic-field detector, for generating coordinate data corresponding to said desired position to be read on said tablet, and for supplying alternating signals to said magnetic-field generating coils, the associated phases of the alternating signals being shifted with respect to each other, each coil having a magnetic field component which when summed with the magnetic field component of an adjacent coil produces a rotating magnetic-field vector, said magnetic-field detector sensing the rotating magnetic-field vector which is comprised of the magnetic field components induced above said tablet, thereby the coordinate data to be read is generated by said processing unit by applying thereto the analog electric signal representing said rotating magnetic-field vector comprising the magnetic-field components, said processing unit including:
first means, operatively connected to said magnetic field detector, for analyzing a fundamental wave component signal and
second means, operatively connected to said magnetic field detector, for analyzing an n-th order harmonic wave component signal contained in said analog electric signal (n being an integer equal to or larger than 2), such that n areas are sequentially defined along one of the coordinate axes of said tablet by said rotating magnetic-field vector, said second means discriminating the desired position to be read finely only in the corresonding one of said n areas, while, said first means discriminates the desired position to be read by discriminating where said corresponding area stands among the n areas.

2. An apparatus as set forth in claim 1, wherein said magnetic-field detector comprises a first pick-up winding and a second pick-up winding, said first pick-up winding being responsive to said fundamental wave component signal and operatively connected to said second means, said second pick-up winding being located at said lower level and said first pick-up winding being located further from said detecting end than said second pick-up winding.

3. An apparatus according to claim 2, operatively connected to receive a clock pulse and a reference signal substantially in phase with respect to said magnetic field vector, further comprising:
a first counter, operatively connected to said first means, said clock means and said reference means, for counting said clock pulses, said first counter being activated by said reference signal and deactivated when said fundamental wave component signal is received from said single pick-up winding; and
a second counter, operatively connected to said second means, said clock means and said reference means, for counting said clock pulses, said second counter being activated when said reference signal and deactivated when said n-th order harmonic wave component signal is received from said single pick-up winding.

4. An apparatus according to claim 1, wherein said magnetic-field detector includes a single pick-up winding located at said lower level of said magnetic-field detector, said apparatus further comprising:
a third means, operatively connected to said first means, said second means, and said magnetic-field detecting means, for receiving said analog electric signal generated by said magnetic-field detecting means and producing both said fundamental and n-th order harmonic wave component signals.

5. An apparatus as set forth in claim 4, wherein said third means analyzes both the n-th order and (n+1)-th order harmonic wave component signals generated by said single pick-up winding and produces a signal equivalent to said fundamental wave component signal by mixing both said n-th order and (n+1)-th order harmonic wave component signals.

6. An apparatus as set forth in claim 5, wherein said third means includes a branching filter operatively connected to said magnetic field detector and a mixer, operatively connected to said branching filter, said branching filter receiving said analog electric signal from said single pick-up winding and producing both the n-th order and (n+1)-th order harmonic wave component signals separately, said mixer receiving the separated n-th order and (n+1)-th order wave component signals simultaneously, producing said signal equivalent to said fundamental wave component signal, and supplying said signal equivalent to said fundamental wave component signal to said first means, the n-th order harmonic wave component signal being supplied directly to said second means.

7. An apparatus as set forth in claim 6, wherein said branching filter includes a first band pass filter for producing said (n+1)-th order harmonic wave component signal and a second band pass filter for producing said n-th order harmonic wave component signal.

8. An apparatus according to claim 7, operatively connected to receive a clock pulse and a reference signal substantially in phase with respect to said magnetic field vector, further comprising:

a first counter, operatively connected to said first means, said clock means and said reference means, for counting said clock pulses, said first counter being activated by said reference signal and deactivated when said fundamental wave component signal is received from said single pick-up winding; and a second counter, operatively connected to said second means, said clock means and said reference means, for counting said clock pulses, said second counter being activated by said reference signal and deactivated when said n-th order harmonic wave component signal is received from said single pick-up winding.

* * * * *

UNITED STATES PATENT AND TRADEMARK OFFICE
CERTIFICATE OF CORRECTION

PATENT NO. : 4,471,162
DATED : September 11, 1984
INVENTOR(S) : Aono et al.

It is certified that error appears in the above-identified patent and that said Letters Patent is hereby corrected as shown below:

Front page, [57] ABSTRACT, line 14, "beread" should be --be read--.

Col. 1, line 35, delete "No." (first occurrence).

Col. 3, line 27, after "coordinates" insert --,--.

Col. 4, line 35, "($\pi/3$), ($2/3\pi$)" should be --$\pi/3$, $2/3\pi$--.

Col. 6, line 35, "$A_m \cos t \sin \omega_m$" should be --$A_m \cos \omega t \sin \phi_m$--.

Col. 9, line 18, "32," should be --32;--.

Col. 10, line 66, "-" should be --+--.

Col. 11, line 4, "+1/4" should be -- -1/4--;

line 12, "the" (first occurrence) should be --a--; "a" should be --the--;

line 18, after "4,418,242" insert --,--.

UNITED STATES PATENT AND TRADEMARK OFFICE
CERTIFICATE OF CORRECTION

PATENT NO. : 4,471,162

DATED : September 11, 1984

INVENTOR(S) : Aono et al.

It is certified that error appears in the above-identified patent and that said Letters Patent is hereby corrected as shown below:

```
Col. 12, line 9, after "(5)" insert --.--.
Col. 14, line 28, "H" should be --H--;
        line 51, after "deviation" insert --)--.
Col. 15, line 34, "order" should be --other--.
Col. 16, line 40, "(dθ/dx)" should be --dθ/dx--;
        line 62, "a" should be --"a"--;
        line 65, "a" should be --"a"--.
Col. 17, line 16, "tablet. And" should be --tablet and--;
        line 54, after "Regarding" insert --the--.
Col. 18, line 56, after "produced" insert --at a time
        which--.
Col. 19, line 65, "coresonding" should be --corresponding--.
```

Signed and Sealed this

Twenty-seventh Day of August 1985

[SEAL]

Attest:

DONALD J. QUIGG

Attesting Officer

Acting Commissioner of Patents and Trademarks